United States Patent
McCarthy et al.

(10) Patent No.: US 7,860,113 B2
(45) Date of Patent: Dec. 28, 2010

(54) ENFORCED ROUTING IN SWITCH

(75) Inventors: Tim F. McCarthy, Hampshire (GB); Roderick Moore, Bournemouth (GB); Jonathan Settle, Southampton (GB); Jon Short, Hampshire (GB)

(73) Assignee: International Business Machines Corporation, Armonk, NY (US)

( * ) Notice: Subject to any disclaimer, the term of this patent is extended or adjusted under 35 U.S.C. 154(b) by 100 days.

(21) Appl. No.: 12/244,038

(22) Filed: Oct. 2, 2008

(65) Prior Publication Data
US 2010/0085976 A1 Apr. 8, 2010

(51) Int. Cl.
*H04L 12/28* (2006.01)
*H04L 12/56* (2006.01)
(52) U.S. Cl. ........................ 370/400; 370/392
(58) Field of Classification Search .............. 370/389, 370/392, 400
See application file for complete search history.

(56) References Cited

U.S. PATENT DOCUMENTS

| 5,751,715 | A | 5/1998 | Chan et al. | |
|---|---|---|---|---|
| 2004/0085974 | A1 | 5/2004 | Mies et al. | |
| 2007/0005862 | A1* | 1/2007 | Seto | 710/300 |
| 2008/0140597 | A1* | 6/2008 | Satir et al. | 706/46 |
| 2009/0074408 | A1* | 3/2009 | Black et al. | 398/45 |

* cited by examiner

*Primary Examiner*—Ronald Abelson
(74) *Attorney, Agent, or Firm*—Scully, Scott, Murphy & Presser, P.C.; Randall Bluestone, Esq.

(57) ABSTRACT

A method and system for enforcing routing in Fibre Channel Arbitrated Loop (FCAL) switch define a message route for an initiator to initiator message in a FCAL network. The message route is for the initiator to initiator message to traverse each selected switch device in the FCAL network. If the message received is an initiator to initiator message, the system and method force the message that is initiator to initiator message to adapt the defined message route. In this way, the initiator to initiator traffic is forced to traverse identified links in a switched network and can identify issues and problems associated in each of the links.

18 Claims, 5 Drawing Sheets

ENFORCED ROUTING IN SWITCH

FIELD OF THE INVENTION

The present disclosure relates to fibre channel network routing, and more particularly to enforcing routing in a fibre channel network switch.

BACKGROUND OF THE INVENTION

Fibre channel is a high-speed network technology used for data storage, providing high data transfer rates over long distances, thus allowing for high-speed storage interconnected over long distances. In a switched fibre channel-arbitrated loop ("FCAL") network, Initiator to Initiator messages no longer traverse the whole network. The shortest route is taken which is one hop into a switch and then to the Initiator. In FCAL loop topology, any Initiator to Initiator messages are transmitted over all the links that make up that loop. FIG. 1 illustrates the known non-switched FCAL arbitrated loop topology. A ping or like status request communication between initiator A (102) and initiator B (104) traverses the entire loop and each disk in the loop. A ping command or like are sent in the direction of the denoted data flow (106 and 108).

FIG. 2 illustrates a known switched loop topology showing limited message function. The current routing of traffic between initiators is to take the shortest path, i.e., a hop into and out of a switch. In switched FCAL loop topology, messages between initiators (202 and 204) take the shortest route (206) and do not traverse the entire or network or all cascaded switches (208 and 210). This limits the function of the initiator to initiator message which was designed to detect any issue in the underlying network infrastructure. If this message does not traverse all the links in the network, it cannot detect any problems with these links.

U.S. Pat. No. 5,751,715 discloses an apparatus for accelerated Fiber Channel protocol handshaking and data exchange that divides a fiber Channel arbitrated loop architecture up into a plurality of arbitrated subloops. This patent teaches to bypass the subloops that do not contain source or destination.

U.S. Patent Application Publication No. 2004/0085974A1 discloses switching Fibre Channel Arbitrated Loop Systems between a plurality of Fibre Channel Loop devices, based in part on arbitrated loop primitives. This application disclosure is directed to arbitration and fairness algorithm used in switched loop topology. While it is disclosed that the system ensures device access fairness through techniques such as a rotating priority system, a counter to count the number of OPNs and priority based on port type, this patent application disclosure teaches to send the OPN directly to the target port, once arbitration is won, regardless of whether the entire switched network has been traversed or not.

BRIEF SUMMARY OF THE INVENTION

A method and system for enforcing routing in Fibre Channel Arbitrated Loop (FCAL) switch are provided. The method in one aspect may comprise defining a message route for an initiator to initiator message in a FCAL network. The message route is for the initiator to initiator message to traverse each selected switch device in the FCAL network. The method may also include determining whether a message is an initiator to initiator message, and forcing the message that is initiator to initiator message to adapt the defined message route.

A method for enforcing routing in Fibre Channel Arbitrated Loop (FCAL) switch, in another aspect, may comprise receiving a message at a switch device and determining whether a message is an initiator to initiator message. The method may also include forcing the message that is initiator to initiator message to adapt a defined message route. The defined message route specifies a route for the initiator to initiator message in a FCAL network to traverse each selected switch device in the FCAL network regardless of whether said each selected switch device is needed for the initiator to initiator message to reach target initiator from starting initiator.

A system for enforcing routing in Fibre Channel Arbitrated Loop (FCAL) switch, in one aspect, may comprise a plurality of switch devices in a FCAL network and a message route defined for an initiator to initiator message in a FCAL network. The message route is for the initiator to initiator message to traverse each selected switch device in the FCAL network. Each of said plurality of switch devices are operable to determine whether a message is an initiator to initiator message and to force the message that is initiator to initiator message to adapt the defined message route.

Further features as well as the structure and operation of various embodiments are described in detail below with reference to the accompanying drawings. In the drawings, like reference numbers indicate identical or functionally similar elements.

DETAILED DESCRIPTION

A method and system are provided that enforce the routing of Initiator to Initiator traffic to ensure all network paths in a loop is traversed. Both initiators may reside on the same switch. The Initiator to Initiator message is beneficial in detecting network problems since relying on Fibre channel or other timeouts can be inefficient. Loss of a message or an error in a message can be used to detect an issue or abnormality with the underlying network. The timeouts can be tailored for the message to meet the high demands of enterprise level storage systems. In FCAL loop topology any initiator to initiator message is transmitted over all the links that make up that loop. If this message does not traverse all of the links in the network it cannot detect any problems with these links.

Figure 1:
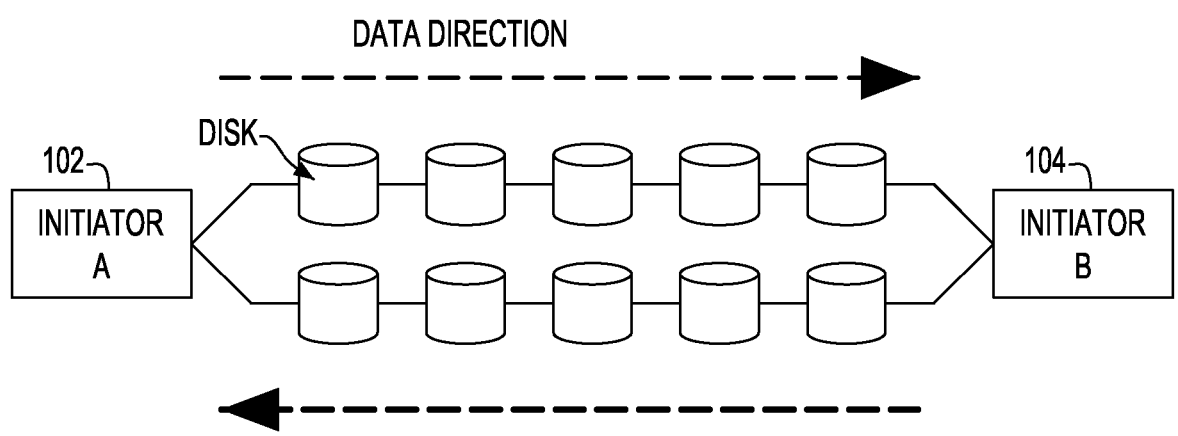
FIG. 1 illustrates known non-switched loop topology.
Figure 2:
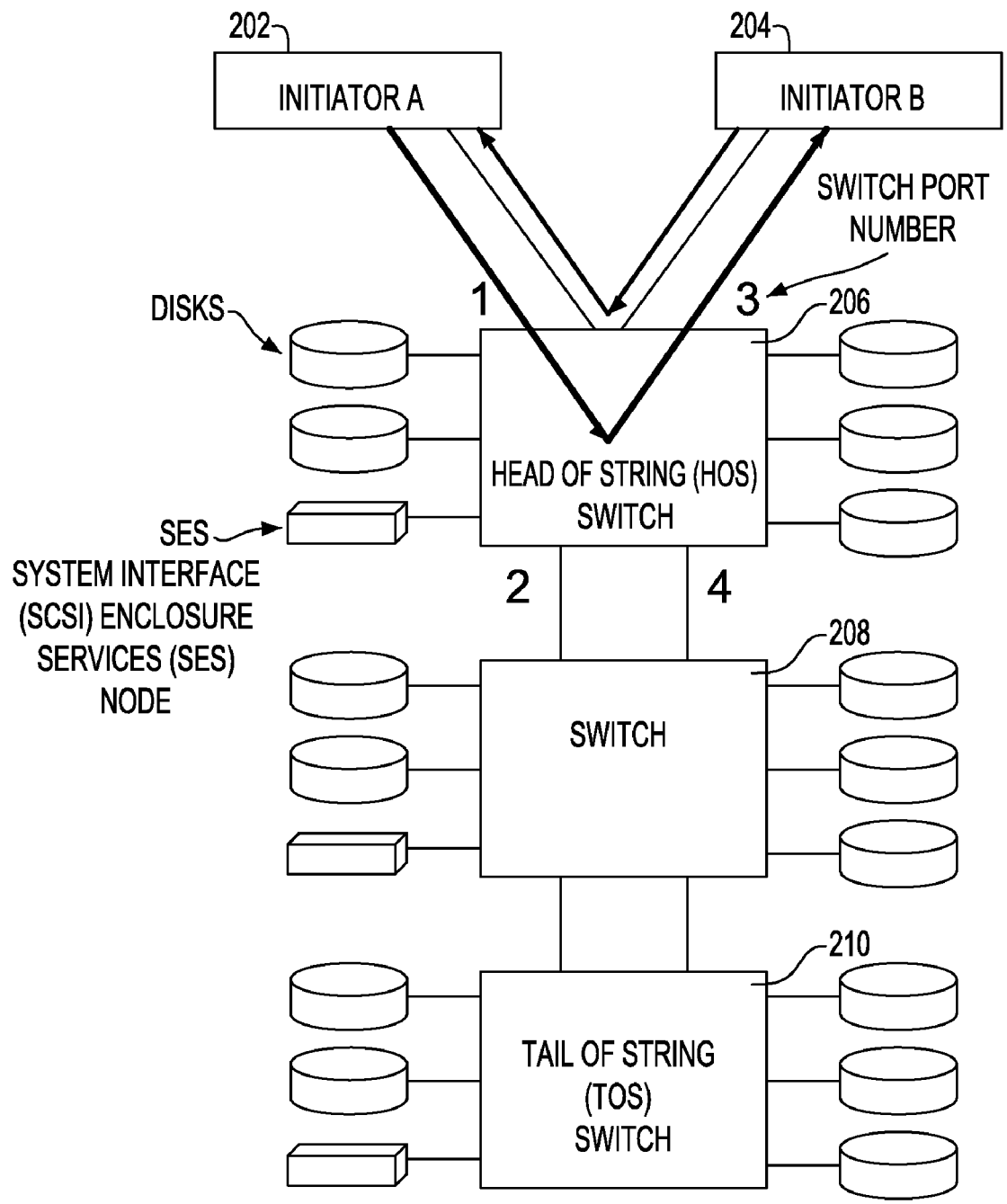
FIG. 2 illustrates known switched loop topology, showing limited message function.
Figure 3A:
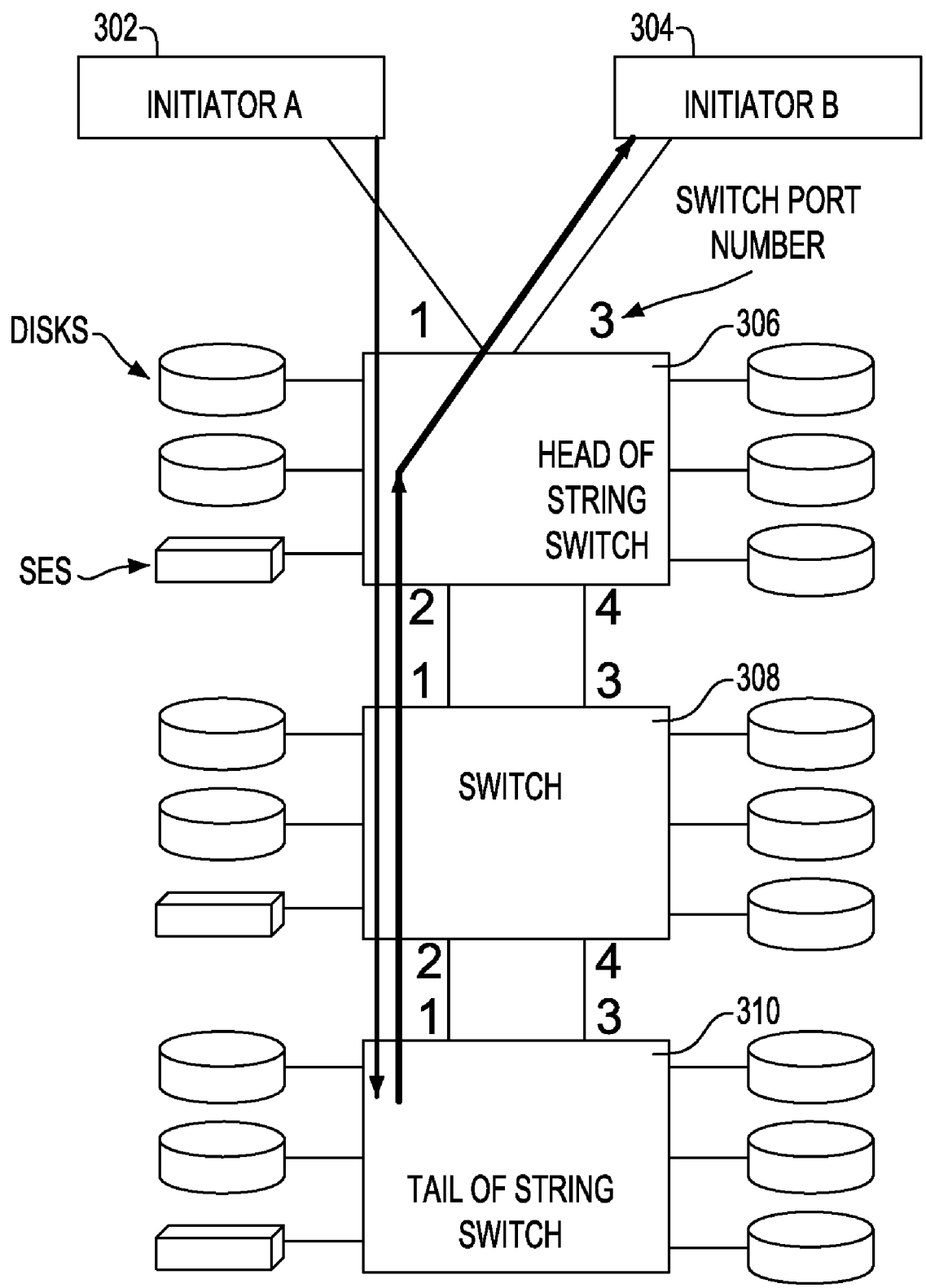
FIG. 3A illustrates enforced routing algorithm in switches in one embodiment of the present disclosure.
Figure 3B:
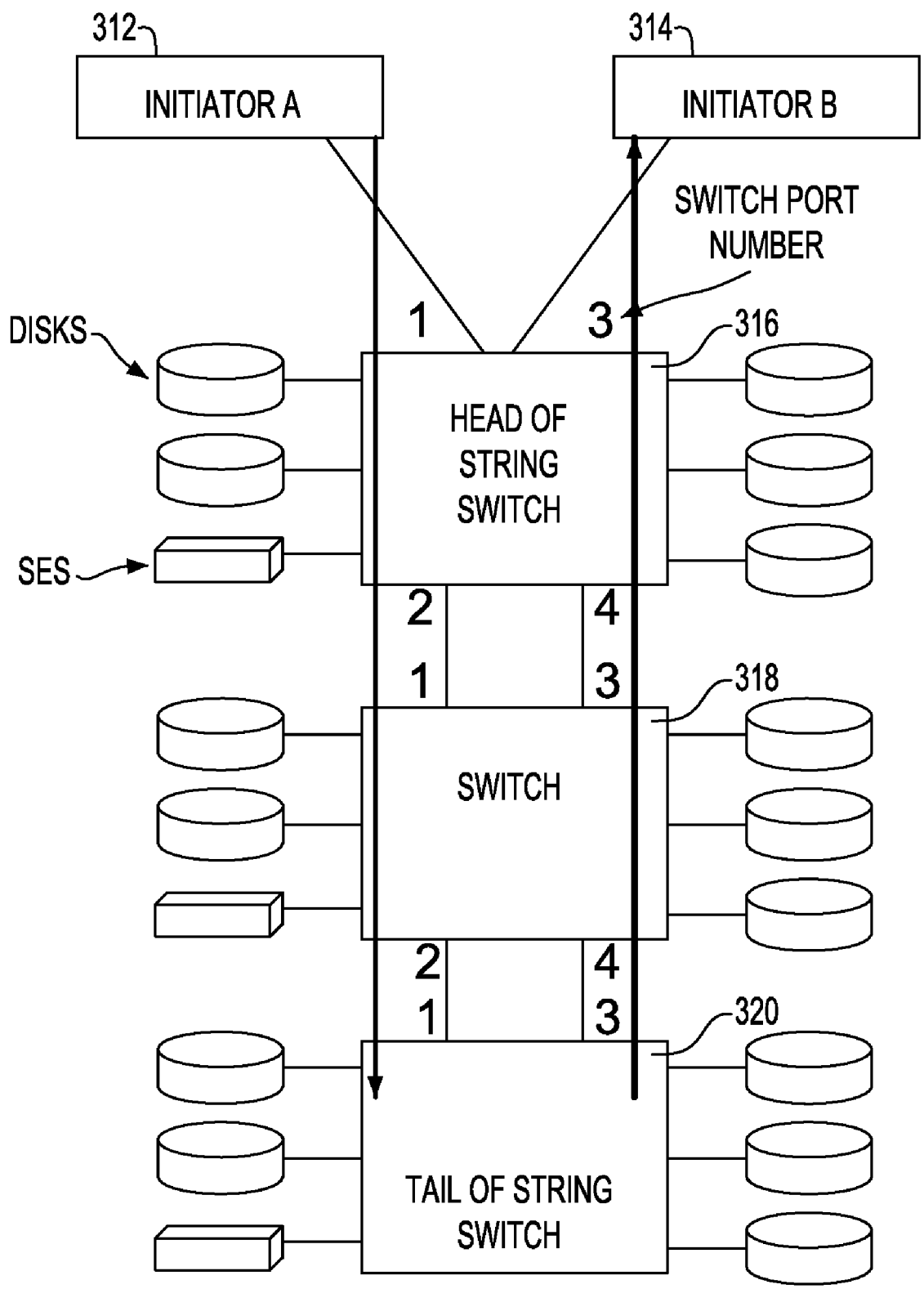
FIG. 3B illustrates enforced routing algorithm in switch in another embodiment of the present disclosure.
Figure 3C:
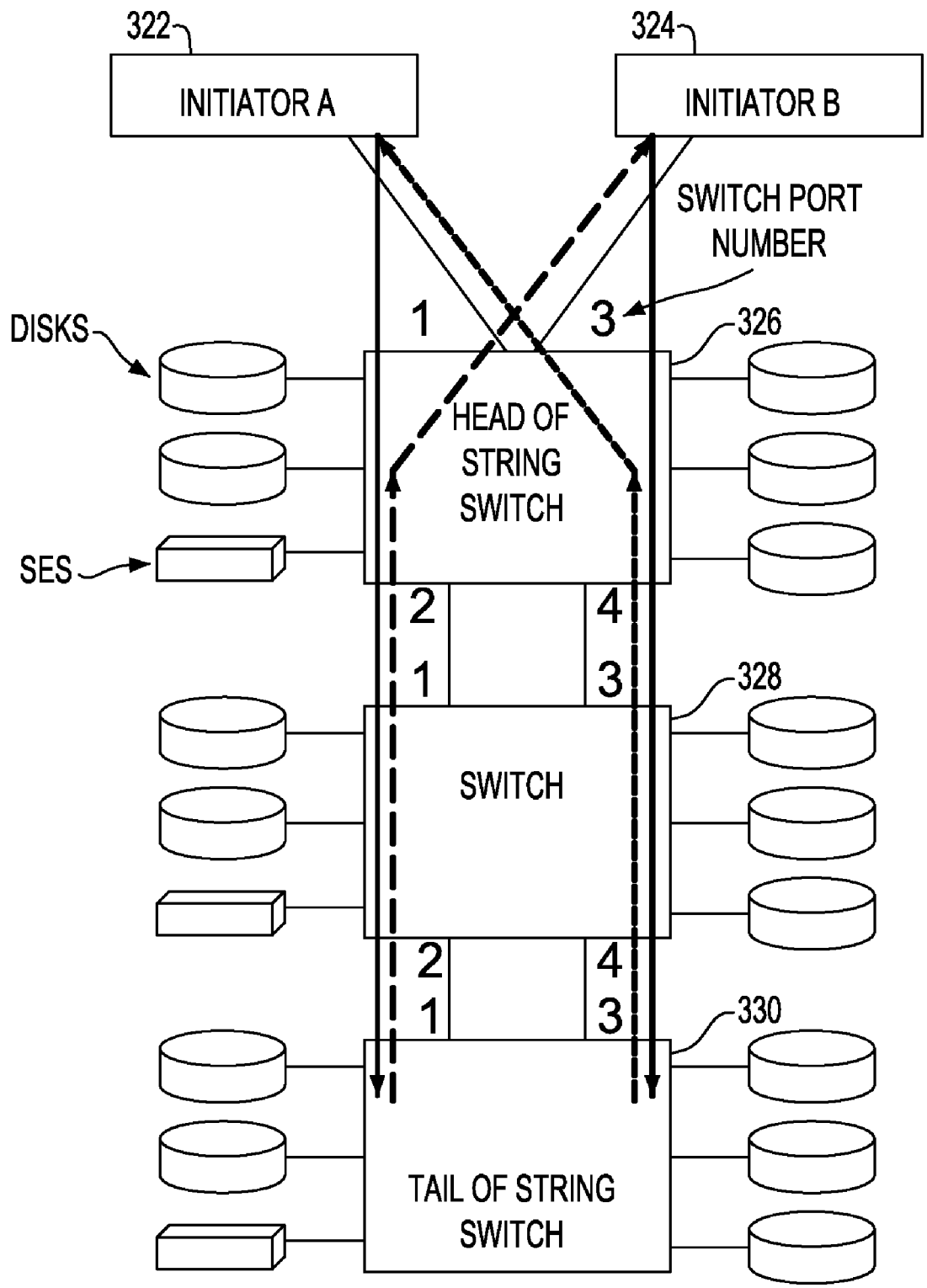
FIG. 3C illustrates enforced routing algorithm in switch in yet another embodiment of the present disclosure.

FIGS. 3A, 3B and 3C illustrate enforced routing algorithm in switches in several embodiments of the present disclosure. The system and method of the present disclosure force the initiator to initiator traffic to traverse identified links in a switched network. This differs from the methodology shown in FIG. 1 where traffic between initiators has to traverse the whole loop.

The system and method of the present disclosure in one embodiment force the switch to perform defined routing for any traffic destined for the other initiator. FIG. 3A illustrates routing in one embodiment of the present disclosure that allows the messages between initiators to test functionality of all switches in a network. With reference to FIG. 3A, an initial OPN (open) of the link from Initiator A (302) to Initiator B (304) is received by the first switch (306) on port 1 and instead of being routed out of port 3, it is routed to the next switch (308) out of port 2. OPN primitive in FCAL protocol is used to open a connection to another device. Each switch in the cascade will follow the same routing rules until the last switch is reached. The last switch (e.g., 310) will route the traffic back, for example, via subtractive routing or by routing tables or other methods, which would route the traffic out of port 1 to port 2 of the upstream switch. In subtractive routing, the last enclosure or switch (e.g., 310) is configured to route any traffic not destined for attached device out of specific upstream port. Routing tables are predefined look up tables that specify the port through which data destined for a specific destination address should be routed. This process continues until the first switch (306) where the traffic is finally routed to the destination Initiator (304).

This routing algorithm is aware of implicit logouts, i.e., in fibre channel terms, where the same OPN (open) is received on a port it (OPN) was sent from. Referring to FIG. 3A, switch 308 forwarding an OPN out of port 2 would expect this OPN to return back into this port after switch 310 has rerouted this traffic back upstream which would normally be classed as an implicit logout. Different network technologies deal with implicit logouts in different ways. In this embodiment of the disclosure, an implicit logout would be seen in all switches for every initiator to initiator message and so is disregarded if relating to this traffic.

A true implicit logout, where the open is not being accepted by the target initiator, would be detected in the HOS switch (306). For instance, switch (306) at its port 3 would detect if initiator B (304) did not accept and OPN from initiator A (302) by detecting at this specific port (port 3 at 306), the OPN returning as an error. Downstream switches would detect the implicit logout as the OPN would be seen three or more time. Error Recovery Procedures (ERPs) can be defined according to the implementers desired goals—i.e., the switch could LIP (force loop re-initialisation by sending Loop Initialise Primitive) or return the OPN back to the message sender (the originator of the OPN) where suitable recovery procedures could be implemented.

In a dynamic system the initiators may change ports or arbitrated loop physical addresses (ALPAs) or both. Each device in fibre channel network has an address that is referred to as ALPA. The Fibre channel protocol transmits data in frames containing payload data. In addition to data frames, there are non-data frames that are used for setup and messaging control purposes. In FCAL and other switched technologies there are standard frames that are only sent from the Initiators during the initialization phases. These frames can be used to determine which port the Initiators are on and what their addresses. For example, non-data frames that are used for setup and messaging purposes such as PLOGI may be used. In PLOGI, which is used for port login for extended link service, the source identifier in the PLOGI frame provides the initiator's address. The inbound port that sees this frame allows the routing topology to be built and the location of the initiators to be defined. Referring to FIG. 3A, for example, Initiator A (302) has source address 1, and initial PLOGI frame was seen to enter into HOS switch (306) on port 1. Therefore, the HOS switch (306) gains the knowledge of the location of an initiator, i.e., the initiator that has address 1 and that exist on port 1 of this switch. In this embodiment, only frames between initiators would be forced through this new routing, hence, only the location of the initiators is needed with respect to the current switch.

The above-described solution is based on one theoretical routing path that could be taken depending upon the implementation specific requirements. Examples of other possible routing algorithms are shown in FIGS. 3B and 3C.

A plurality of routing options or paths is available to cover all potential paths in the network and therefore test all connections. FIG. 3B illustrates a routing path in another embodiment of the present disclosure. The routing methodology shown in FIG. 3B uses different enforced routing such that upstream traffic is sent out of different port than the port that received the traffic. For example, Initiator A (312) is routed to port 1 of HOS switch (316). HOS switch (316) routes the traffic via its port 2 to switch (318), routes return traffic via its port 3 to initiator B (314). Switch (318) routes the traffic via its port 2 to TOS switch (320), routes return traffic via port 3 to HOS switch (316). TOS Switch (320) receives a frame on its port 1 and reroutes the frame out of port 3. Recall that in the routing algorithm shown in FIG. 3A, the traffic is rerouted on the same receiver port. The routing algorithm can be defined when the architecture of the system is designed.

FIG. 3C illustrates routing path yet in another embodiment of the present disclosure. This routing algorithm shows an embodiment that covers all network paths by mirroring the routing defined in FIG. 3A for the second initiator initiated messages. Message initiated from initiator A (322) is routed downstream to HOS switch (326), switch (328) and TOS switch (330) and rerouted upstream to initiator B (324) via the same ports, except at HOS switch (326) where the message is routed initiator B (324) via port 3. Likewise, message initiated from initiator B (324) is routed downstream to HOS switch (326), switch (328) and TOS switch (330) and rerouted upstream to initiator A (322) via the same ports, except at HOS switch (326) where the message is routed initiator A (322) via port 1.

While FIGS. 3A, 3B and 3C showed three switch devices as example, it should be understood that any number of switch devices may exist in a FCAL network. Using the mechanism identified above, it is possible to force all Initiator to Initiator messages to traverse a specific network path. Thus, it is possible to use this mechanism in order to detect any problems in any links in the network.

Various aspects of the present disclosure may be embodied as a program, software, or computer instructions embodied in a computer or machine usable or readable medium, which causes the computer or machine to perform the steps of the method when executed on the computer, processor, and/or machine.

The system and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and server.

A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A method for enforcing routing in Fibre Channel Arbitrated Loop (FCAL) switch, comprising:
    defining a message route for an initiator to initiator message in a FCAL network, the message route for the initiator to initiator message to traverse each selected switch device in the FCAL network;
    determining whether a message is an initiator to initiator message; and
    forcing the message that is initiator to initiator message to adapt the defined message route
    wherein the step of determining whether a message is an initiator to initiator messages includes:
    using FCAL non-data frame to determine which ports initiators are on and addresses of the initiators.

2. The method of claim 1, wherein the step of defining a message route includes selecting a port in said each selected switch device via which to route the message.

3. The method of claim 1, wherein the message route is defined using a routing table.

4. The method of claim 1, wherein the message route is defined using subtractive routing.

5. The method of claim 1, wherein the non-data frame includes PLOGI frame.

6. The method of claim 1, wherein upstream traffic for the initiator to initiator message is defined in the message route to use same ports as downstream traffic for the initiator to initiator message.

7. The method of claim 1, wherein upstream traffic for the initiator to initiator message is defined in the message route to use different ports than downstream traffic for the initiator to initiator message.

8. The method of claim 1, wherein the message route is predefined.

9. A system for enforcing routing in Fibre Channel Arbitrated Loop (FCAL) switch, comprising:
    a plurality of switch devices in a FCAL network; and
    a message route defined for an initiator to initiator message in a FCAL network, the message route for the initiator to initiator message to traverse each selected switch device in the FCAL network,
    each of said plurality of switch devices operable to determine whether a message is an initiator to initiator message and force the message that is initiator to initiator message to adapt the defined message route,
    wherein said each of said plurality of switch devices determines whether a message is an initiator to initiator messages using FCAL non-data frame to determine which ports initiators are on and addresses of the initiators.

10. The system of claim 9, wherein the message route is defined to include a selected port in said each selected switch device via which to route the message.

11. The system of claim 9, wherein the message route is defined using a routing table.

12. The system of claim 9, wherein the message route is defined using subtractive routing.

13. The system of claim 9, wherein the non-data frame includes PLOGI frame.

14. The system of claim 9, wherein upstream traffic for the initiator to initiator message is defined in the message route to use same ports as downstream traffic for the initiator to initiator message.

15. The system of claim 9, wherein upstream traffic for the initiator to initiator message is defined in the message route to use different ports than downstream traffic for the initiator to initiator message.

16. The system of claim 9, wherein the message route is predefined.

17. A method for enforcing routing in Fibre Channel Arbitrated Loop (FCAL) switch, comprising:
    receiving a message at a switch device;
    determining whether a message is an initiator to initiator message; and
    forcing the message that is initiator to initiator message to adapt a defined message route,
    said defined message route specifying a route for the initiator to initiator message in a FCAL network to traverse each selected switch device in the FCAL network regardless of whether said each selected switch device is needed for the initiator to initiator message to reach target initiator from starting initiator,
    wherein the step of determining whether a message is an initiator to initiator messages includes using FCAL non-data frame to determine which ports initiators are on and addresses of the initiators.

18. The method of claim 17, wherein the message route is defined using a routing table.

* * * * *